US012660064B2

(12) United States Patent
Fan

(10) Patent No.: US 12,660,064 B2
(45) Date of Patent: Jun. 16, 2026

(54) LIGHT EMITTING ELEMENT DRIVER WITH SHUNT DIMMING FUNCTION AND METHOD THEREOF

(71) Applicant: Chengdu Monolithic Power Systems Co., Ltd., Chengdu (CN)

(72) Inventor: Zilin Fan, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 30 days.

(21) Appl. No.: 18/962,106

(22) Filed: Nov. 27, 2024

(65) Prior Publication Data

US 2025/0185136 A1 Jun. 5, 2025

(30) Foreign Application Priority Data

Dec. 1, 2023 (CN) ........................ 202311641633.6

(51) Int. Cl.

| | |
|---|---|
| ***H05B 45/30*** | (2020.01) |
| ***H05B 45/14*** | (2020.01) |
| ***H05B 45/37*** | (2020.01) |
| ***H05B 45/44*** | (2020.01) |

(52) U.S. Cl.

CPC ............. *H05B 45/44* (2020.01); *H05B 45/14* (2020.01); *H05B 45/37* (2020.01)

(58) Field of Classification Search

CPC ........ H05B 45/10; H05B 45/14; H05B 45/30; H05B 45/325; H05B 45/37; H05B 45/375; H05B 45/48

See application file for complete search history.

(56) References Cited

U.S. PATENT DOCUMENTS

| | | | | |
|---|---|---|---|---|
| 8,604,710 | B2 | 12/2013 | Yu et al. | |
| 9,408,272 | B2 * | 8/2016 | Lian | H05B 45/56 |
| 9,717,123 | B1 * | 7/2017 | Yao | H05B 45/10 |
| 11,343,886 | B2 | 5/2022 | Ding et al. | |
| 11,523,478 | B2 | 12/2022 | Yu et al. | |
| 2012/0104964 | A1 * | 5/2012 | Hughes | H05B 45/14 315/291 |
| 2013/0293154 | A1 * | 11/2013 | Kuang | H05B 45/37 315/307 |
| 2016/0366742 | A1 * | 12/2016 | Lee | H05B 45/48 |
| 2021/0045212 | A1 * | 2/2021 | Lai | H05B 45/14 |
| 2021/0068220 | A1 * | 3/2021 | Ding | H05B 45/10 |

* cited by examiner

*Primary Examiner* — Thai Pham

(74) *Attorney, Agent, or Firm* — Perkins Coie LLP

(57) ABSTRACT

A control circuit for a light emitting element driver with a power converter and a shunt switch is provided. The control circuit includes a delay terminal, a dimming terminal, a control terminal and a driving terminal. The delay terminal receives a reference signal. The dimming terminal receives a dimming signal. The dimming signal has a first state and a second state. The control terminal provides a control signal to control the power converter. The driving terminal provides a shunt switch control signal to the shunt switch, to turn off the shunt switch after a first delay time from a time when the dimming signal is switched from the first state to the second state, and to turn on the shunt switch after a second delay time from a time when the dimming signal is switched from the second state to the first state.

20 Claims, 6 Drawing Sheets

LIGHT EMITTING ELEMENT DRIVER WITH SHUNT DIMMING FUNCTION AND METHOD THEREOF

CROSS-REFERENCE TO RELATED APPLICATIONS

This application claims the benefit of and priority to a CN application 202311641633.6, filed on Dec. 1, 2023, which is incorporated herein by reference into the present application.

TECHNICAL FIELD

The present invention generally relates to electronic circuits, and more particularly but not exclusively to control circuits for light emitting element drivers and associated methods.

BACKGROUND

Dimming function is often used for light emitting elements to meet different application requirements. As one of the light emitting elements, LED (Light Emitting Diode) is widely used. The brightness of the LED depends on an average current flowing through the LED. Currently, there are two ways to adjust the average current flowing through the LED. One is to adjust the amplitude of the current flowing through the LED, i.e., analog dimming. The other one is to adjust the duty cycle of PWM (Pulse Width Modulation) signal to control the average current flowing through the LED, i.e., PWM dimming. Furthermore, PWM dimming could be divided into conventional PWM dimming and shunt PWM dimming. In conventional PWM dimming, a control circuit controls an operation of a power converter based on the PWM signal to adjust the average current. For example, the power converter is controlled to provide an output current when the PWM signal is at a high voltage level and is controlled to stop providing the output current when the PWM signal is at a low voltage level. In shunt PWM dimming, a shunt switch is used to bypass the output current of the power converter, and the control circuit controls the turning on and off of the shunt switch to adjust the average current. In applications that require higher dimming accuracy, it is common to combine the analog dimming with the PWM dimming, i.e., hybrid dimming to achieve the accurate dimming.

However, in conventional PWM dimming, due to the output current of the power converter may not change rapidly in response to the transition of the PWM signal, there is a difference between the actual average current and the desired average current, and therefore the dimming accuracy is limited. On the other hand, in shunt PWM dimming, a portion of the output current provided by the power converter is bypassed or consumed by the shunt switch, which is not converted into light energy, resulting in large energy loss and low system efficiency. Therefore, it is desirable to provide a way to achieve the accurate dimming and high system efficiency simultaneously.

SUMMARY

An embodiment of the present invention discloses a control circuit for a light emitting element driver with a power converter and a shunt switch. The control circuit includes a delay terminal, a dimming terminal, a control terminal and a driving terminal. The delay terminal receives a reference signal. The dimming terminal receives a dimming signal. The dimming signal has a first state and a second state. The control terminal provides a control signal to control the power converter. The driving terminal provides a shunt switch control signal to the shunt switch, to turn off the shunt switch after a first delay time from a time when the dimming signal is switched from the first state to the second state, and to turn on the shunt switch is turned on by the shunt switch control signal after a second delay time from a time when the dimming signal is switched from the second state to the first state.

Another embodiment of the present invention discloses a light emitting element driver. The light emitting element driver has a power converter, a shunt switch and a control circuit. The power converter provides an output current for a light emitting element. The shunt switch is coupled in parallel with a light emitting element. The control circuit includes a delay terminal, a dimming terminal, a control terminal and a driving terminal. The delay terminal receives a reference signal. The dimming terminal receives a dimming signal. The dimming signal includes a first state and a second state. The control terminal provides a control signal to control the power converter. The driving terminal provides a shunt switch control signal to the shunt switch, to turn off the shunt switch after a first delay time from a time when the dimming signal is switched from the first state to the second state, and to turn on the shunt switch after a second delay time from a time when the dimming signal is switched from the second state to the first state.

Yet another embodiment of the present invention discloses a method for controlling a light emitting element driver with a power converter and a shunt switch coupled in parallel with a light emitting element. The method includes the following steps. A dimming signal, a reference signal and a feedback signal indicating an output current of the power converter are received. A first delay signal indicating a first delay time and a second delay signal indicating a second delay time are provided based on the dimming signal and the reference signal. A dimming processing signal and a shunt switch control signal are provided based on the dimming signal, the first delay signal and the second delay signal. A control signal is provided to control the power converter based on the dimming processing signal and the feedback signal. The shunt switch is controlled based on the shunt switch control signal.

BRIEF DESCRIPTION OF DRAWINGS

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

Figure 1:
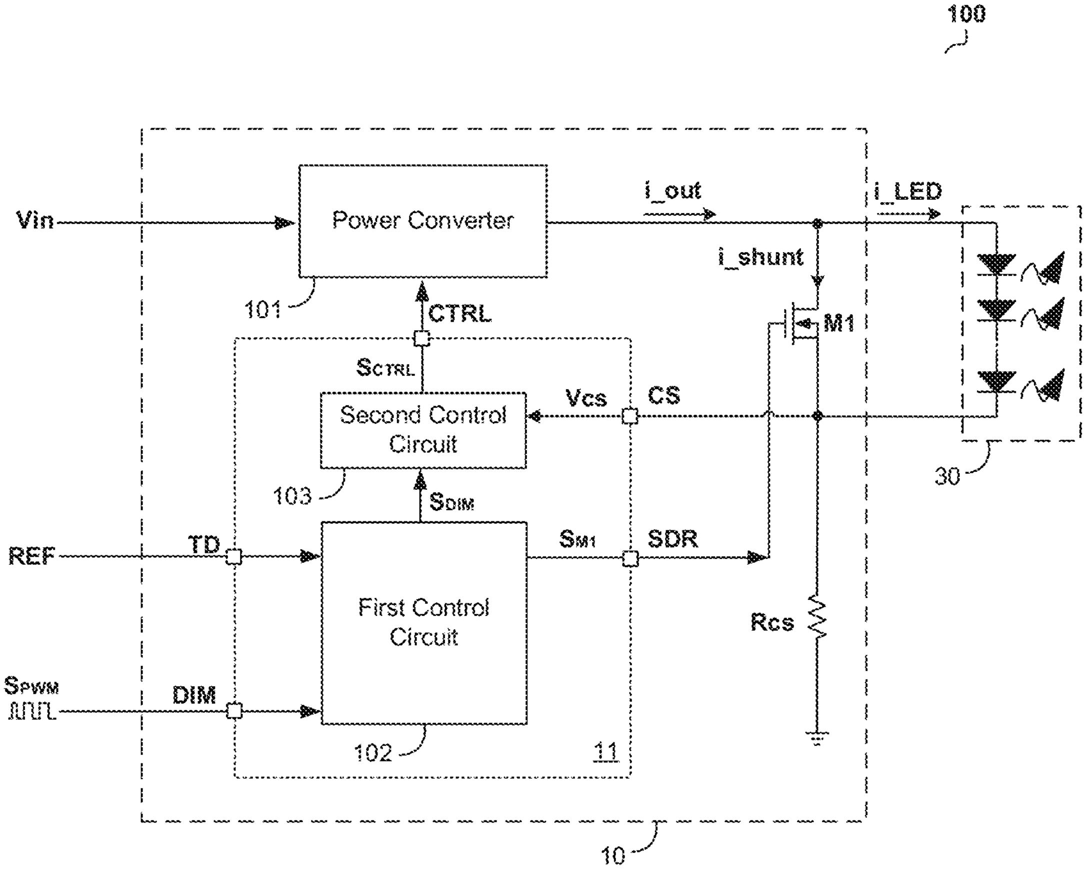
FIG. 1 shows a block diagram of a light emitting element driving system in accordance with an embodiment of the present invention.

FIG. 1 shows a block diagram of a light emitting element driving system 100 in accordance with an embodiment of the present invention. The light emitting element driving system 100 includes a light emitting element driver 10 and a light emitting element 30. The light emitting element 30 may include one LED, or multiple LED strings coupled in series and/or in parallel. In other embodiments, the light emitting element driver 10 may also be used to drive other suitable light emitting elements, such as solid-state lighting devices.

As shown in FIG. 1, the light emitting element driver 10 includes a power converter 101, a shunt switch M1 and a control circuit 11. The power converter 101 is configured to receive an input voltage Vin, and to provide an output current i_out. As shown in FIG. 1, the shunt switch M1 is coupled in parallel with the light emitting element 30. In the embodiment of FIG. 1, the shunt switch M1 is a field effect transistor having a first terminal (e.g., source), a second terminal (e.g., drain) and a control terminal (e.g., gate). In other embodiments, the shunt switch M1 may be other suitable controllable switches. The shunt switch M1 may be turned on or off. In one embodiment, when the shunt switch M1 is turned on, the output current i_out provided by the power converter 101 flows through the shunt switch M1, and no current flows through the light emitting element 30. When the shunt switch M1 is turned off, the output current i_out of the power converter 101 is provided to the light emitting element 30 as a load current i_LED.

In the embodiment shown in FIG. 1, the control circuit 11 includes a first control circuit 102 for controlling the shunt switch M1 and a second control circuit 103 for controlling the power converter 101. In the embodiment shown in FIG. 1, the control circuit is an integrated circuit. In other words, the first control circuit 102 and the second control circuit 103 are both integrated in the integrated circuit. In some embodiments, the first control circuit 102 and the second control circuit 103 are integrated in different integrated circuits. As shown in FIG. 1, the control circuit 11 includes a delay terminal TD, a dimming terminal DIM and a driving terminal SDR. The first control circuit 102 is coupled between the delay terminal TD, the dimming terminal DIM and the driving terminal SDR. The first control circuit 102 receives a reference signal REF through the delay terminal TD and a dimming signal $S_{PWM}$ through the dimming terminal DIM. The first control circuit 102 provides a dimming processing signal $S_{DIM}$ and a shunt switch control signal $S_{M1}$ based on the reference signal REF and the dimming signal $S_{PWM}$. In one embodiment, the dimming signal $S_{PWM}$ has a first state and a second state, the dimming processing signal $S_{DIM}$ has the first state and the second state, and the shunt switch control signal $S_{M1}$ also has the first state and the second state. In some embodiments, the first state indicates a low voltage level, and the second state indicates a high voltage level.

In one embodiment, the dimming signal $S_{PWM}$ is a square wave signal. The shunt switch control signal $S_{M1}$ is provided to the shunt switch M1 through the driving terminal SDR to turn on or turn off the shunt switch M1. In one embodiment, when the shunt switch control signal $S_{M1}$ is at the high voltage level, the shunt switch M1 is turned on. The output current i_out provided by the power converter 101 flows through the shunt switch M1, and no current flows through the light emitting element 30. In another embodiment, when the shunt switch control signal $S_{M1}$ is at the low voltage level, the shunt switch M1 is turned off. The output current i_out of the power converter 101 is provided to the light emitting element 30 as the load current i_LED.

In the embodiment shown in FIG. 1, the control circuit 11 further includes a control terminal CTRL and a detection terminal CS. The second control circuit 103 is coupled to the control terminal CTRL and the detection terminal CS. The second control circuit 103 is configured to receive the dimming processing signal $S_{DIM}$ provided by the first control circuit 102, and to receive a feedback signal Vcs indicating the output current i_out through the detection terminal CS. The second control circuit 103 is configured to provide a control signal $S_{CTRL}$ based on the dimming processing signal $S_{DIM}$ and the feedback signal Vcs. The control signal $S_{CTRL}$ is provided to the power converter 101 through the control terminal CTRL to control the power converter 101. In one embodiment, when the dimming processing signal $S_{DIM}$ is at the high voltage level, the second control circuit 103 is configured to provide the control signal $S_{CTRL}$ based on the feedback signal Vcs, and the power converter 101 provides the output current i_out based on the control signal $S_{CTRL}$. In another embodiment, when the dimming processing signal $S_{DIM}$ is at the low voltage level, the control signal $S_{CTRL}$ provided by the second control circuit 103 controls the power converter 101 to stop providing the output current i_out. In one embodiment, a sense resistor Rcs is used to generate the feedback signal Vcs to indicate the output current i_out. In the embodiment shown in FIG. 1, a first terminal of the sense resistor Rcs is coupled to the shunt switch M1, and a second terminal of the sense resistor Rcs is coupled to a reference ground.

Figure 2:
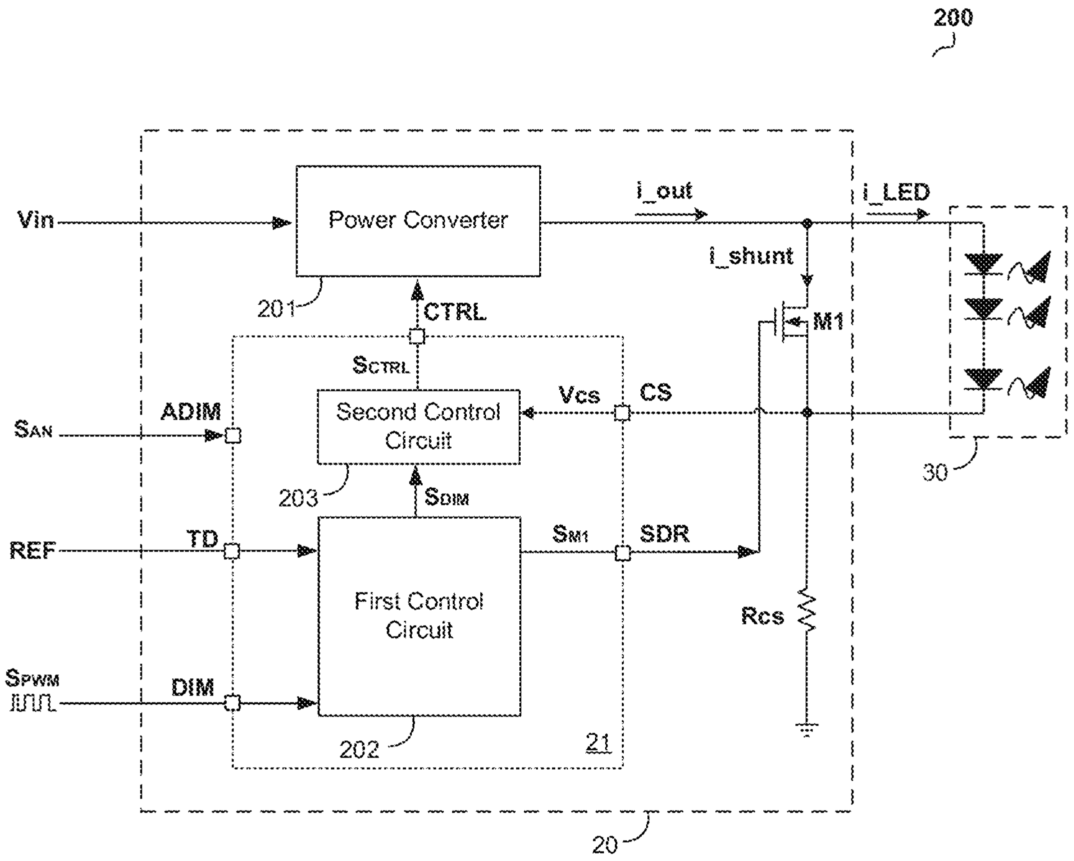
FIG. 2 shows a block diagram of a light emitting element driving system in accordance with an embodiment of the present invention.

FIG. 2 shows a block diagram of a light emitting element driving system 200 in accordance with an embodiment of the present invention. Compared with FIG. 1, a control circuit 21 in FIG. 2 further includes an analog dimming terminal ADIM configured to receive an analog dimming signal $S_{AN}$. In some embodiments, when the dimming depth of the light emitting element 30 is high, the analog dimming signal $S_{AN}$ is used to achieve analog dimming. In some embodiments, the dimming depth is a value indicating the brightness of the light emitting element 30. For example, when the dimming depth is 100%, which means that the light emitting element 30 is at its highest brightness. In other embodiments, the dimming depth represents the adjustable brightness range of the light emitting element 30. For example, when the dimming depth is 10%, which means that the brightness of the light emitting element 30 could be decreased from its highest brightness to 10% of the highest brightness. For another example, when the dimming depth is 20%, which means that the brightness of the light emitting element 30 could be decreased from its highest brightness to 20% of the highest brightness. In this case, the value of the dimming depth is lower, the dimming depth performance of the light emitting element 30 is better.

When the dimming depth is higher than a dimming reference, the control circuit 21 operates in an analog dimming mode (i.e., the amplitude of the output current i_out is adjusted to achieve dimming) based on the analog dimming signal $S_{AN}$. In one embodiment, the amplitude of the output current i_out is adjusted by controlling the on time of switches of the power converter 201 based on the analog dimming signal $S_{AN}$. When the dimming depth is lower than the dimming reference, the control circuit 21 operates in a hybrid dimming mode (i.e., the analog dimming and PWM dimming are both used to achieve dimming) based on the analog dimming signal $S_{AN}$ and the dimming signal $S_{PWM}$. For example, when the control circuit 21 operates in the hybrid dimming mode, the analog dimming signal $S_{AN}$ is applied to achieve the dimming depth of 10% firstly, then the dimming signal $S_{PWM}$ is added to further decrease the dimming depth to 10%*D, where D represents the duty cycle of the dimming signal $S_{PWM}$. The dimming reference could be set according to the practical application requirements. In one embodiment, the dimming reference is set to 10%. In another embodiment, the dimming reference is set to 5%.

Figure 3:
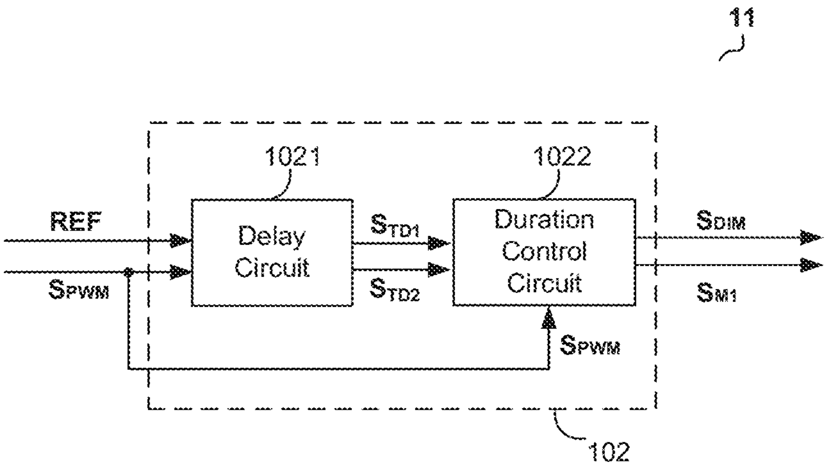
FIG. 3 shows a block diagram of a first control circuit of a control circuit shown in FIG. 1 in accordance with an embodiment of the present invention.

FIG. 3 shows a block diagram of the first control circuit 102 of the control circuit 11 shown in FIG. 1 in accordance with an embodiment of the present invention. In the embodiment of FIG. 3, the first control circuit 102 includes a delay circuit 1021 and a duration control circuit 1022. The delay circuit 1021 is configured to receive the reference signal REF and the dimming signal $S_{PWM}$, and to provide a first delay signal $S_{TD1}$ and a second delay signal $S_{TD2}$ based on the reference signal REF and the dimming signal $S_{PWM}$. The first delay signal $S_{TD1}$ indicates a first delay time TD1 and the second delay signal $S_{TD2}$ indicates a second delay time TD2. In some embodiments, the first delay time TD1 and the second delay time TD2 are determined by the reference signal REF. The duration control circuit 1022 is configured to receive the first delay signal $S_{TD1}$, the second delay signal $S_{TD2}$ and the dimming signal $S_{PWM}$, and to provide the dimming processing signal $S_{DIM}$ and the shunt switch control signal $S_{M1}$ based on the first delay signal $S_{TD1}$, the second delay signal $S_{TD2}$ and the dimming signal $S_{PWM}$.

Figure 4:
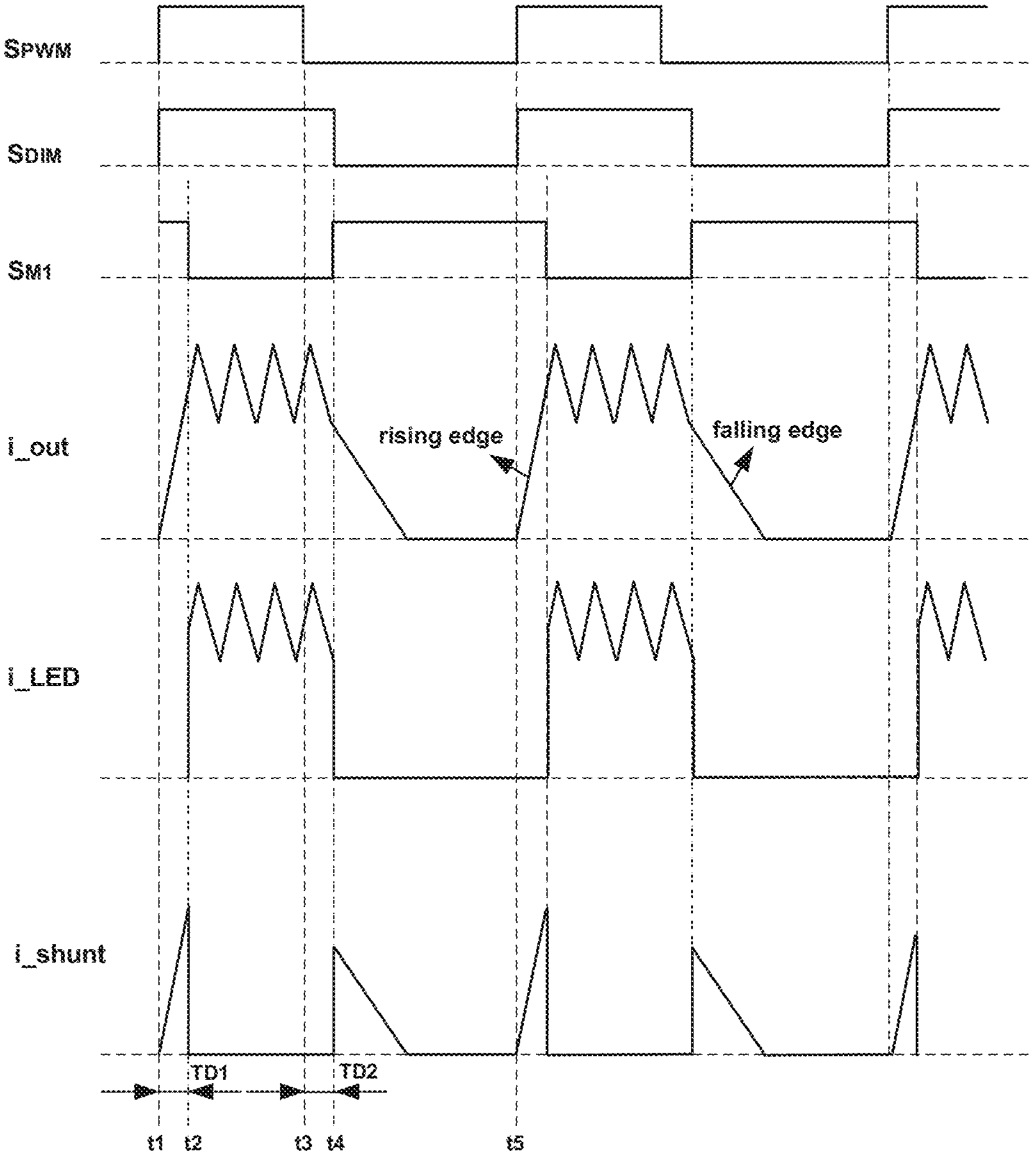
FIG. 4 shows working waveforms of the light emitting element driving system shown in FIG. 1 in accordance with an embodiment of the present invention.

FIG. 4 shows working waveforms of the light emitting element driving system 100 shown in FIG. 1 in accordance with an embodiment of the present invention. The waveforms of the dimming signal $S_{PWM}$, the dimming processing signal $S_{DIM}$, the shunt switch control signal $S_{M1}$, the output current i_out, the load current i_LED, and a shunt current i_shunt flowing through the shunt switch M1 are shown in FIG. 4. The working principle of the light emitting element driving system 100 is illustrated below with reference to FIGS. 1, 3 and 4.

At time t1, the dimming signal $S_{PWM}$ is switched from the low voltage level to the high voltage level, the dimming processing signal $S_{DIM}$ provided by the first control circuit 102 is switched from the low voltage level to the high voltage level. During time t1-t2, the dimming processing signal $S_{DIM}$ is at the high voltage level, the second control circuit 103 provides the control signal $S_{CTRL}$ based on the feedback signal Vcs to control the power converter 101 to provide the output current i_out. Meanwhile, the shunt switching control signal $S_{M1}$ is at the high voltage level, the shunt switch M1 is turned on. Thus, the shunt current i_shunt flowing through the shunt switch M1 is equal to the output current i_out, and the load current i_LED flowing through the light emitting element 30 is zero.

After the first delay time TD1 indicated by the first delay signal $S_{TD1}$, at time t2, the shunt switch control signal $S_{M1}$ is switched from the high voltage level to the low voltage level, the shunt switch M1 is turned off. During time t2-t3, the dimming signal $S_{PWM}$ and the dimming processing signal $S_{DIM}$ maintain the high voltage level, and the power converter 101 provides the output current i_out. Meanwhile, the shunt switch control signal $S_{M1}$ maintains the low voltage level, and the shunt switch M1 maintains off. The shunt current i_shunt flowing through the shunt switch M1 is equal to zero, and the load current i_LED flowing through the light emitting element 30 is equal to the output current i_out provided by the power converter 101.

At time t3, the dimming signal $S_{PWM}$ is switched from the high voltage level to the low voltage level. After the second delay time TD2 indicated by the second delay signal $S_{TD2}$, at time t4, the dimming processing signal $S_{DIM}$ is switched from the high voltage level to the low voltage level. The second control circuit 103 provides the control signal $S_{CTRL}$ to control the power converter 101 to stop providing the output current i_out. At the same time, the shunt switch control signal $S_{M1}$ is switched from the low voltage level to the high voltage level, and the shunt switch M1 is turned on. During time t4-t5, the dimming signal $S_{PWM}$ and the dimming processing signal $S_{DIM}$ maintain the low voltage level, and the power converter 101 stops providing the output current i_out. The shunt switch control signal $S_{M1}$ maintains the high voltage level, and the shunt switch M1 maintains on. The shunt current i_shunt flowing through the shunt switch M1 is equal to the output current i_out, and the load current i_LED flowing through the light emitting element 30 is zero.

At time t5, the dimming signal $S_{PWM}$ is switched from the low voltage level to the high voltage level, and a new cycle starts.

It should be noted that the first delay time TD1 and the second delay time TD2 may be set according to a delay time of the output current i_out with respect to the dimming signal $S_{DIM}$ in practical application. For example, the first delay time TD1 and the second delay time TD2 may be both in a range of 1-3 μs. In one embodiment, the first delay time TD1 and the second delay time TD2 are both set to 2 μs. In another embodiment, the first delay time TD1 is set to 1.8 μs and the second delay time TD2 is set to 2.2 μs.

Typically, when the shunt PWM dimming is applied, the power converter provides the output current regardless of whether the shunt switch is turned on or off. Thus, the output current flowing through the shunt switch results in energy loss and degrades system efficiency. On the other hand, when the conventional PWM dimming is applied, the output current of the power converter has the rising edge and the falling edge when the control signal of the power converter transitions between the high voltage level and the low voltage level, which reduces the accuracy of dimming. For example, as shown in FIG. 4, when the dimming processing signal $S_{DIM}$ transitions between the high voltage level and the low voltage level, the output current i_out of the power converter 101 has wide rising and falling edges in every cycle. The actual average of the output current i_out is different from the desired average of the output current i_out. Therefore, there is a deviation between the actual brightness and the desired brightness of the light emitting element 30.

In the embodiments of the present invention, a delay processing is performed on each pulse of the dimming signal $S_{PWM}$ to obtain the dimming processing signal $S_{DIM}$, and another delay processing is performed on each pulse of the dimming signal $S_{PWM}$ to obtain the shunt switch control signal $S_{M1}$. To be specific, the dimming processing signal $S_{DIM}$ is provided to control the power converter 101 based on the second delay time TD2 and the dimming signal $S_{PWM}$, and the shunt switch control signal $S_{M1}$ is provided to control the shunt switch M1 based on the first delay time TD1, the second delay time TD2 and the dimming signal $S_{PWM}$. On the one hand, the power converter 101 is controlled to stop providing the output current i_out during the partial on-time of the shunt switch M1 (e.g., time t4-t5 shown in FIG. 4), thus the energy loss of the output current i_out on the shunt switch M1 is reduced and the system efficiency is improved. On the other hand, through the delay control of the power converter 101 and the shunt switch M1, the rising and falling edges of the output current i_out could be bypassed and not affecting the load current i_LED provided to the light emitting element 30, thereby improving the dimming accuracy.

Specifically, high dimming accuracy means that there is a smaller difference between the actual dimming depth and the target dimming depth. In other words, the difference between the actual brightness and the desired brightness is small. By contrast, low dimming accuracy means that there is a larger difference between the actual dimming depth and the target dimming depth. For instance, when the target dimming depth is 20%, the actual dimming depth reaches only 25% in conventional dimming, and therefore the dimming accuracy is poor. On the contrary, the actual dimming depth could reach 20% by using the light emitting element driver in the present disclosure. For another instance, when the target dimming depth is 10%, the actual dimming depth could reach 12%, or even 10% by using the light emitting element driver in the present disclosure. Thus, a good linear relationship between the actual dimming depth and the target dimming depth could be achieved by improving the dimming accuracy. Therefore, the light emitting element driver in the present disclosure could simply and efficiently achieve accurate dimming control of the light emitting element, not only the dimming range is wider, and the linearity is better, but also the efficiency of the entire light emitting element driving system is improved.

Figure 5:
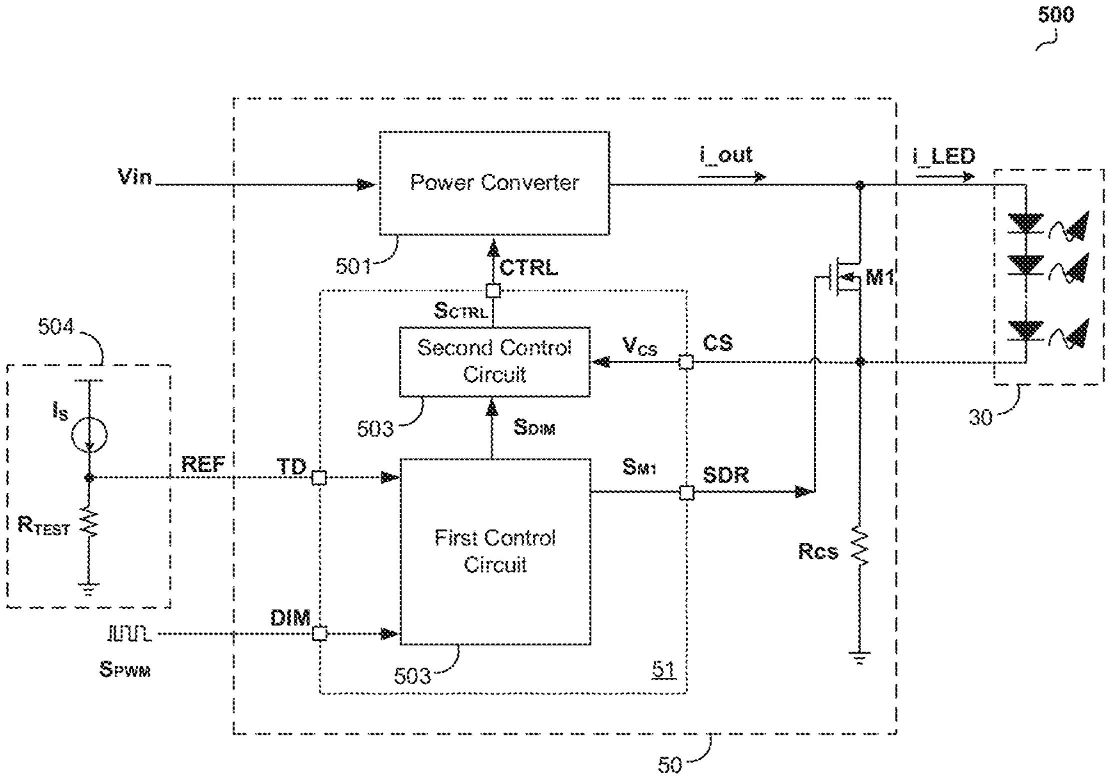
FIG. 5 shows a block diagram of a light emitting element driving system in accordance with an embodiment of the present invention.

FIG. 5 shows a block diagram of a light emitting element driving system 500 in accordance with an embodiment of the present invention. As shown in FIG. 5, the reference signal REF is a reference voltage provided by the reference signal generating circuit 504. In the embodiment of FIG. 5, the reference signal generating circuit 504 includes a resistor $R_{TEST}$ and a current source $I_S$ coupled in series to provide a reference voltage. In some embodiments, one or both of the current source $I_S$ and the resistor $R_{TEST}$ is integrated in a control circuit 51. In one embodiment, the voltage of the reference signal REF is set by the resistance of the resistor $R_{TEST}$. In another embodiment, the voltage of the reference signal REF is set by the current value of the current source $I_S$. In some embodiments, the reference signal REF is set by both the resistance of the resistor $R_{TEST}$ and the current value of the current source $I_S$. In one embodiment, the resistance of the resistor $R_{TEST}$ could be determined based on the inductance of an inductor of the power converter 501 and the switching frequency of the power converter 501. The working principle of the light emitting element driving system 500 in the embodiment of FIG. 5 is similar to the light emitting element driving system 100 in the embodiment of FIG. 1 and will not be repeated here for brevity.

It should be appreciated that the reference signal generating circuit 504 may also be implemented by other circuits. In one embodiment, the reference signal generating circuit 504 includes a voltage source for providing the reference signal REF represented by the reference voltage. In some embodiments, the reference signal generating circuit 504 is implemented by a digital circuit. In other embodiments, the reference signal generating circuit 504 is implemented by an automatic generation circuit by hardware description language. The value of the reference signal REF may be adjusted according to requirements of practical applications.

Figure 6:
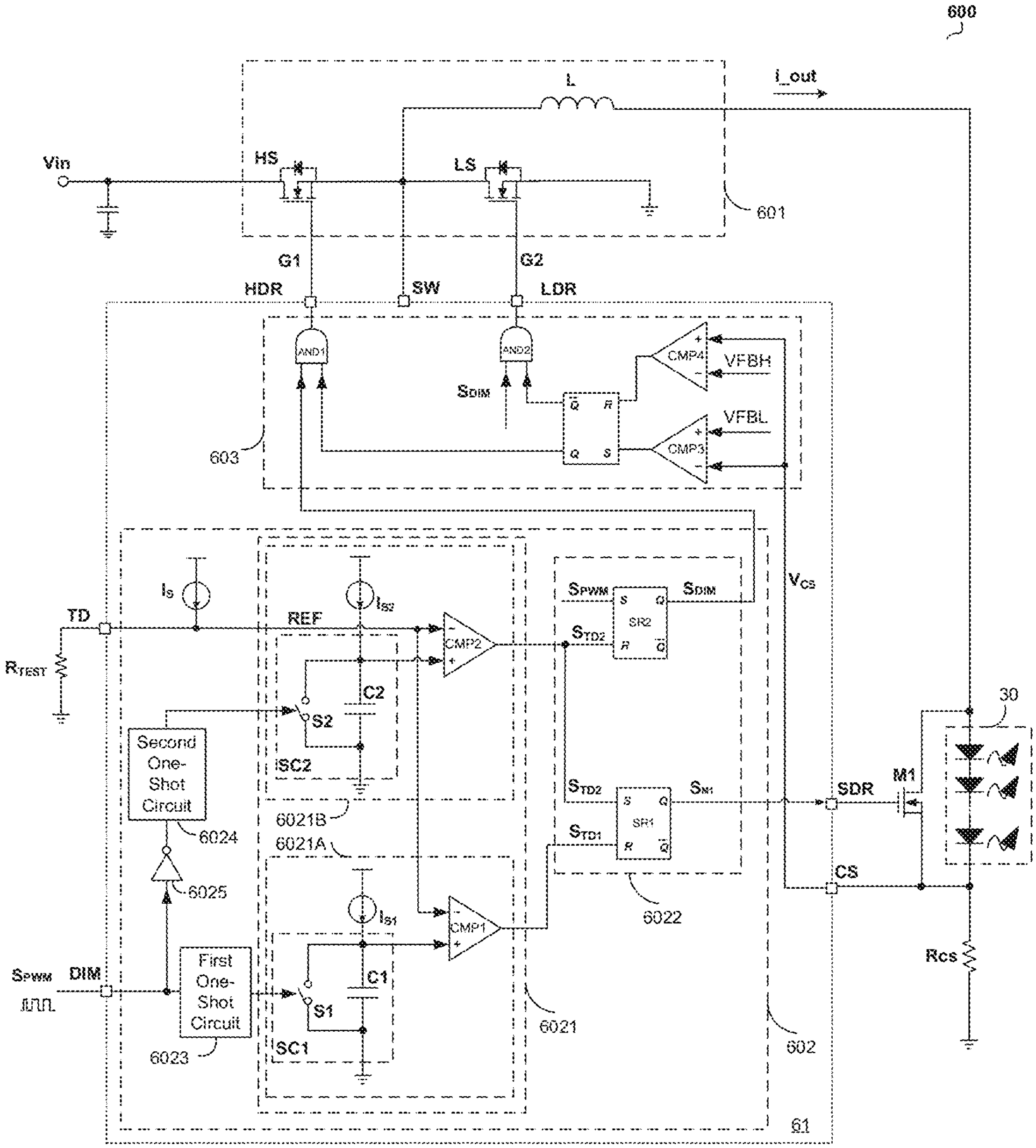
FIG. 6 shows a schematic diagram of a light emitting element driving system in accordance with an embodiment of the present invention.

FIG. 6 shows a schematic diagram of a light emitting element driving system 600 in accordance with an embodiment of the present invention. As shown in FIG. 6, the light emitting element driving system 600 includes a power converter 601, the shunt switch M1 coupled in parallel with the light emitting element 30, a control circuit 61 and the light emitting element 30. The control circuit 61 includes a first control circuit 602 and a second control circuit 603. In the embodiment of FIG. 6, the control circuit 61 is an integrated circuit having the delay terminal TD, the dimming terminal DIM, the driving terminal SDR and control terminals HDR and LDR.

The power converter 601 is coupled between the input voltage Vin and the light emitting element 30. The power converter 601 is configured to receive control signals G1 and G2 provided by the control circuit 61, and to provide the output current i_out to the light emitting element 30 based on the control signals G1 and G2. In the embodiment shown in FIG. 6, the power converter 601 is a buck converter including transistors HS and LS as well as an inductor L. In other embodiments, the power converter 601 may adopt any suitable topology including DC-DC converters, AC-DC converters, for example, boost converters, buck-boost converters and flyback converters. As shown in FIG. 6, the control signals G1, G2 are provided to the power converter 601 through the control terminals HDR and LDR. The control signal G1 is provided to turn on and turn off the transistor HS. The control signal G2 is provided to turn on and turn off the transistor LS. Those skilled in the art should understand that the power converter 601 could adopt any suitable control method, such as peak current control, hysteresis control, and constant on-time control.

In the embodiment shown in FIG. 6, the first control circuit 602 receives the reference signal REF through the delay terminal TD and the dimming signal $S_{PWM}$ through the dimming terminal DIM and provides the shunt switch control signal $S_{M1}$ to turn on and turn off of the shunt switch M1 based on the reference signal REF and the dimming signal $S_{PWM}$. In the embodiment of FIG. 6, the value of the reference signal REF is determined by the resistor $R_{TEST}$ and the current source $I_S$. The current source $I_S$ is integrated in the control circuit 61. In other embodiments, both the resistor $R_{TEST}$ and the current source $I_S$ are external components located outside of the IC. As shown in FIG. 6, the first control circuit 602 includes a delay circuit 6021 and a duration control circuit 6022. The delay circuit 6021 includes a first delay circuit 6021A configured to provide the first delay signal $S_{TD1}$ and a second delay circuit 6021B configured to provide the second delay signal $S_{TD2}$. The structure and function of the first delay circuit 6021A and the second delay circuit 6021B are similar.

As shown in FIG. 6, the first delay circuit 6021A includes a first current source $I_{S1}$, a first comparator CMP1 and a first switched-capacitor circuit SC1. The second delay circuit 6021B includes a second current source $I_{S2}$, a second comparator CMP2 and a second switched-capacitor circuit SC2. The current sources $I_{S1}$ is configured to charge a capacitor C1 of the switched-capacitor circuit SC1. The current sources $I_{S2}$ is configured to charge a capacitor C2 of the switched-capacitor circuit SC2. The comparator CMP1 is configured to compare a voltage across the capacitor C1 of the switched-capacitor circuit SC1 with the reference signal REF. The comparator CMP2 is configured to compare a voltage across the capacitor C2 of the switched-capacitor circuit SC2 with the reference signal REF. Switches S1 and S2 in the switched-capacitor circuit SC1 and SC2 are controlled by the dimming signal $S_{PWM}$.

The duration control circuit 6022 includes a first RS flip-flop SR1 and a second RS flip-flop SR2. A set terminal of the first RS flip-flop SR1 is configured to receive the second delay signal $S_{TD2}$. A reset terminal of the first RS flip-flop SR1 is configured to receive the first delay signal $S_{TD1}$. An output terminal of the first RS flip-flop SR1 is configured to provide the shunt switch control signal $S_{M1}$ to control the shunt switch M1. A set terminal of the second RS flip-flop SR2 is configured to receive the dimming signal $S_{PWM}$. A reset terminal of the second RS flip-flop SR2 is configured to receive the second delay signal $S_{TD2}$. An output terminal of the second RS flip-flop SR2 is configured to provide the dimming process signal $S_{DIM}$ to the second control circuit 603 for controlling the power converter 601.

In the embodiment shown in FIG. 6, the second control circuit 603 receives the dimming processing signal $S_{DIM}$ and the feedback signal Vcs indicating the output current i_out. Based on the dimming processing signal $S_{DIM}$ and the feedback signal Vcs, the second control circuit 603 provides the control signal G1 to control the transistor HS of the power converter 601 and the control signal G2 to control the transistor LS of the power converter 601.

As shown in FIG. 6, the control circuit 61 further includes a first one-shot circuit 6023, a second one-shot circuit 6024 and an inverter 6025. The one-shot circuit 6023 is configured to turn off the switch S1 of the switched-capacitor circuit SC1 when the received signal of the one-shot circuit 6023 is switched from the first state to the second state. The one-shot circuit 6024 is configured to turn off the switch S2 of the switched-capacitor circuit SC2 when the received signal of the one-shot circuit 6024 is switched from the first state to the second state. For example, at time t1 shown in FIG. 4, the switch S1 of the first switched-capacitor circuit SC1 is turned off by the first one-shot circuit 6023 when the dimming signal $S_{PWM}$ is switched from the low voltage level to high voltage level. The working principle of the light emitting element driving system 600 is described below with reference to FIGS. 4 and 6.

When the dimming signal $S_{PWM}$ is switched from the low voltage level to the high voltage level (e.g., time t1 shown in FIG. 4), the switch S1 of the first switched-capacitor circuit S1 is turned off, the first current source $I_{S1}$ charges the capacitor C1. When the voltage across the capacitor C1 is charged to be higher than the reference signal REF, the comparator CMP1 provides the first delay signal $S_{TD1}$ to reset the first RS flip-flop SR1. Thus, the shunt switch control signal $S_{M1}$ is switched from the high voltage level to the low voltage level to turn off the shunt switch M1 (e.g., time t2 shown in FIG. 4). In other words, after a charging time of the capacitor C1 (i.e., the first delay time TD1) from the time when the dimming signal $S_{PWM}$ is switched from the low voltage level to high voltage level, the shunt switch control signal $S_{M1}$ is switched from the high voltage level to low voltage level, and the shunt switch M1 is turned off. Since the dimming signal $S_{PWM}$ is provided to the second one-shot circuit 6024 after being inverted by the inverter 6025, the switch S2 in the second switched-capacitor circuit SC2 maintains on when the dimming signal $S_{PWM}$ is switched from the low voltage level to high voltage level. The voltage across the second switched-capacitor circuit SC2 is lower than the reference signal REF. In this case, the second RS flip-flop SR2 receives the dimming signal $S_{PWM}$ at its set terminal and provides the dimming processing signal $S_{DIM}$ switched from the low voltage level to the high voltage level to the second control circuit 603. In other words, the dimming processing signal $S_{DIM}$ follows the dimming signal $S_{PWM}$ to switch from the low voltage level to high voltage level.

After the dimming processing signal $S_{DIM}$ is switched from the low voltage level to high voltage level, the dimming processing signal $S_{DIM}$ with high voltage level controls the second control circuit 603 to provide the control signals G1 and G2 based on the feedback signal Vcs indicating the output current i_out. Thus, the alternate turning on and off of the transistors HS and LS of the power converter 601 are controlled by the control signals G1 and G2. Thereby, the output current i_out could be provided. Furthermore, the range of the output current i_out could be determined by an upper limit threshold voltage VFBH and a lower limit threshold voltage VFBL. In some embodiments, the upper limit threshold voltage VFBH and the lower limit threshold voltage VFBL are adjusted based on the analog dimming signal $S_{AN}$ to achieve analog dimming. It should be appreciated that, the upper limit threshold voltage VFBH and the lower limit threshold voltage VFBL could be preset or adjusted according to actual applications.

When the dimming signal $S_{PWM}$ is switched from the high voltage level to the low voltage level (e.g., time t3 shown in FIG. 4), the switch S2 in the second switched-capacitor circuit SC2 is turned off, and the second current source $I_{S2}$ charges the capacitor C2. When the voltage across the capacitor C2 is charged to be higher than the reference signal REF, the comparator CMP2 provides the second delay signal $S_{TD2}$ to reset the second flip-flop SR2. Thus, the dimming processing signal $S_{DIM}$ is switched from the high voltage level to the low voltage level (e.g., at time t4 shown in FIG. 4). By contrast, when the dimming signal $S_{PWM}$ is switched from the high voltage level to the low voltage level, the switch S1 in the first switched-capacitor circuit SC1 maintains on, the voltage across the capacitor C1 is lower than the reference signal REF. As shown in FIG. 6, the first flip-flop SR1 receives the second delay signal $S_{TD2}$ at its reset terminal and provides the shunt switch control signal $S_{M1}$ switched from the low voltage level to the high voltage level to turn on the shunt switch M1. In other words, after the charging time of the capacitor C2 (i.e., the second delay time TD2) from when the dimming signal $S_{PWM}$ is switched from the high voltage level to low voltage level, the dimming processing signal $S_{DIM}$ is switched from the high voltage level to low voltage level, the shunt switch control signal $S_{M1}$ is switched from the low voltage level to high voltage level, the shunt switch M1 is turned on.

When the dimming processing signal $S_{DIM}$ is switched from the high voltage level to low voltage level, the control signal G1 provided by the second control circuit 603 turns off the transistor HS and the control signal G2 provided by the second control circuit 603 turns off the transistor LS, the power converter 601 stops providing the output current i_out.

It should be understood that structures and components of the above circuits as well as the variation of the waveforms are only for illustration purpose, and the present invention is not limited thereto. Person skilled in the art may adopt other circuits with different structures and adjust the corresponding signal forms to realize the corresponding functions according to the actual application requirements. For example, the delay circuit 6021 and the duration control circuit 6022 may be realized by digital circuits, analog circuits, software, or a combination of the above.

Figure 7:
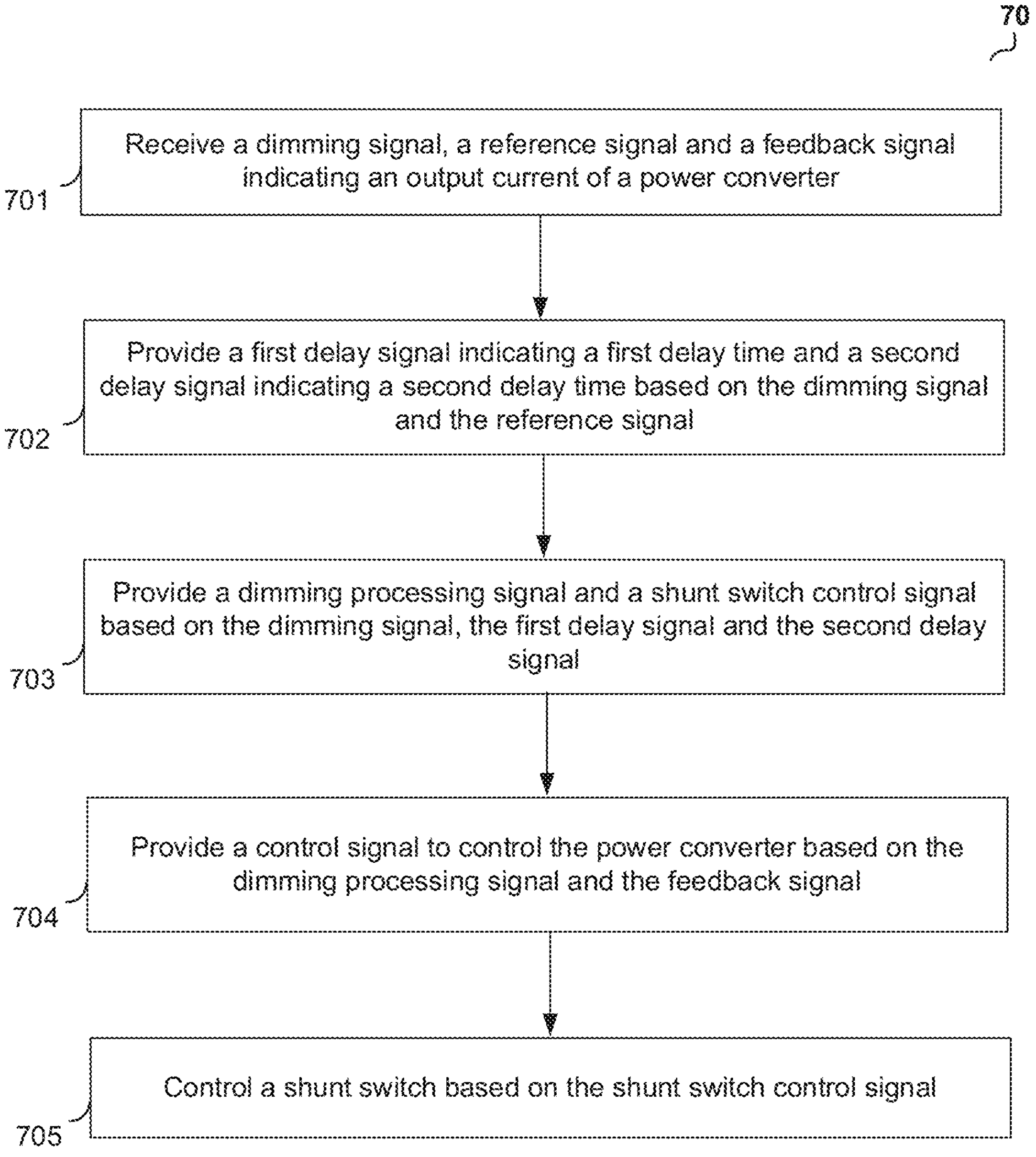
FIG. 7 shows a flow diagram of a method for controlling a light emitting element driver in accordance with an embodiment of the present invention.

FIG. 7 shows a flow diagram of a method 70 for controlling a light emitting element driver in accordance with an embodiment of the present invention. The light emitting element driver includes a power converter and a shunt switch, and the method 70 includes steps 701-705.

At step 701, a dimming signal, a reference signal, and a feedback signal indicating the output current of the power converter are received.

At step 702, a first delay signal indicating a first delay time and a second delay signal indicating a second delay time are provided based on the dimming signal and the reference signal.

At step 703, a dimming processing signal and a shunt switch control signal are provided based on the dimming signal, the first delay signal and the second delay signal.

At step 704, a control signal is provided to control the power converter based on the dimming processing signal and the feedback signal.

At step 705, the shunt switch is controlled based on the shunt switch control signal.

In one embodiment, the step 704 includes the following steps. The control signal is provided to control the power converter to provide the output current based on the dimming processing signal and the feedback signal when the dimming signal is switched from a first state to a second state. The control signal is provided to control the power converter to stop providing the output current based on the dimming processing signal after the second delay time indicated by the second delay signal from a time when the dimming signal is switched from the second state to the first state.

In one embodiment, the step 705 includes the following steps. The shunt switch control signal turns off the shunt switch after the first delay time indicated by the first delay signal from the time when the dimming signal is switched from the first state to the second state. The shunt switch control signal turns on the shunt switch after the second delay time indicated by the second delay signal from the time when the dimming signal is switched from the second state to the first state.

It is noted that in the flow charts described above, the functions labelled in the boxes shown in FIG. 7 can also occur in a different sequence. For example, two consecutive blocks, in fact, can be executed substantially concurrently, or they may sometimes be executed in the reverse order, depending upon the particular function involved.

In the present invention, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Obviously, many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated, and they obviously will be resorted to by those skilled in the art without departing from the spirit and the scope of the invention as hereinafter defined by the appended claims as only a preferred embodiment(s) thereof has been disclosed.

What is claimed is:

1. A control circuit for a light emitting element driver with a power converter and a shunt switch, the control circuit comprising:

a delay terminal configured to receive a reference signal;

a dimming terminal configured to receive a dimming signal, wherein the dimming signal has a first state and a second state;

a control terminal configured to provide a control signal to control the power converter; and a driving terminal configured to provide a shunt switch control signal to the shunt switch, to turn off the shunt switch after a first delay time from a time when the dimming signal is switched from the first state to the second state, and to turn on the shunt switch after a second delay time from a time when the dimming signal is switched from the second state to the first state.

2. The control circuit of claim 1, further comprising:

a first control circuit configured to receive the dimming signal and the reference signal, and to provide a dimming processing signal and the shunt switch control signal based on the dimming signal and the reference signal; and a second control circuit configured to receive the dimming processing signal and a feedback signal indicating an output current of the power converter, and to provide the control signal based on the dimming processing signal and the feedback signal.

3. The control circuit of claim 1, wherein:

the power converter is controlled to provide an output current when the dimming signal is switched from the first state to the second state, and the power converter is controlled to stop providing the output current after the second delay time from the time when the dimming signal is switched from the second state to the first state.

4. The control circuit of claim 1, wherein the first delay time and the second delay time are both in a range of 1-3 μs.

5. The control circuit of claim 1, further comprising:

an analog dimming terminal configured to receive an analog dimming signal; wherein when a dimming depth of the light emitting element is higher than a dimming reference, the control circuit operates in an analog dimming mode based on the analog dimming signal; and when the dimming depth of the light emitting element is lower than the dimming reference, the control circuit operates in a hybrid dimming mode based on the analog dimming signal and the dimming signal.

6. The control circuit of claim 2, wherein the first control circuit comprises:

a delay circuit configured to receive the dimming signal and the reference signal, and to provide a first delay signal indicating the first delay time and a second delay signal indicating the second delay time based on the dimming signal and the reference signal; and a duration control circuit configured to receive the first delay signal, the second delay signal and the dimming signal, and to provide the dimming processing signal and the shunt switch control signal based on the first delay signal, the second delay signal and the dimming signal.

7. The control circuit of claim 1, wherein the first delay time and second delay time are determined by the reference signal.

8. The control circuit of claim 7, wherein the reference signal is provided by a resistor coupled to the delay terminal.

9. A light emitting element driver, comprising:

a power converter configured to provide an output current for a light emitting element;

a shunt switch coupled in parallel with the light emitting element; and a control circuit, comprising:

a delay terminal configured to receive a reference signal;

a dimming terminal configured to receive a dimming signal, wherein the dimming signal has a first state and a second state;

a control terminal configured to provide a control signal to control the power converter; and a driving terminal configured to provide a shunt switch control signal to the shunt switch, to turn off the shunt switch after a first delay time from a time when the dimming signal is switched from the first state to the second state, and to turn on the shunt switch after a second delay time from a time when the dimming signal is switched from the second state to the first state.

10. The light emitting element driver of claim 9, further comprising:

a first control circuit configured to receive the dimming signal and the reference signal, and to provide a dimming processing signal and the shunt switch control signal based on the dimming signal and the reference signal; and a second control circuit configured to receive the dimming processing signal and a feedback signal indicating the output current of the power converter, and to provide the control signal based on the dimming processing signal and the feedback signal.

11. The light emitting element driver of claim 9, wherein:

the power converter is controlled to provide the output current when the dimming signal is switched from the first state to the second state, and the power converter is controlled to stop providing the output current after the second delay time from the time when the dimming signal is switched from the second state to the first state.

12. The light emitting element driver of claim 9, wherein the first delay time and the second delay time are both in a range of 1-3 μs.

13. The light emitting element driver of claim 9, further comprising:

an analog dimming terminal configured to receive an analog dimming signal; wherein when a dimming depth of the light emitting element is higher than a dimming reference, the control circuit operates in an analog dimming mode based on the analog dimming signal; and when the dimming depth of the light emitting element is lower than the dimming reference, the control circuit operates in a hybrid dimming mode based on the analog dimming signal and the dimming signal.

14. The light emitting element driver of claim 10, wherein the first control circuit comprises:

a delay circuit configured to receive the dimming signal and the reference signal, and to provide a first delay signal indicating the first delay time and a second delay signal indicating the second delay time based on the dimming signal and the reference signal; and a duration control circuit configured to receive the first delay signal, the second delay signal and the dimming signal, and to provide the dimming processing signal and the shunt switch control signal based on the first delay signal, the second delay signal and the dimming signal.

15. The light emitting element driver of claim 9, wherein the first delay time and the second delay time are determined by the reference signal.

16. A method for controlling a light emitting element driver with a power converter and a shunt switch, the method comprising:

receiving a dimming signal, a reference signal and a feedback signal indicating an output current of the power converter;

providing a first delay signal indicating a first delay time and a second delay signal indicating a second delay time based on the dimming signal and the reference signal;

providing a dimming processing signal and a shunt switch control signal based on the dimming signal, the first delay signal and the second delay signal;

providing a control signal to control the power converter based on the dimming processing signal and the feedback signal; and controlling the shunt switch based on the shunt switch control signal.

17. The method of claim 16, wherein the step of providing the control signal to control the power converter based on the dimming processing signal and the feedback signal comprises:

controlling the power converter to provide the output current based on the dimming processing signal and the feedback signal when the dimming signal is switched from a first state to a second state; and controlling the power converter to stop providing the output current based on the dimming processing signal after the second delay time indicated by the second delay signal from a time when the dimming signal is switched from the second state to the first state.

18. The method of claim 16, wherein the step of controlling the shunt switch based on the shunt switch control signal comprises:

turning off the shunt switch after the first delay time indicated by the first delay signal from a time when the dimming signal is switched from a first state to a second state; and turning on the shunt switch after the second delay time indicated by the second delay signal from a time when the dimming signal is switched from the second state to the first state.

19. The method of claim 16, wherein the first delay time and the second delay time are both in a range of 1-3 μs.

20. The method of claim 16, further comprising:

receiving an analog dimming signal; wherein controlling the light emitting element driver based on the analog dimming signal when a dimming depth of the light emitting element is higher than a dimming reference; and controlling the light emitting element driver based on the analog dimming signal and the dimming signal when the dimming depth of the light emitting element is lower than the dimming reference.

* * * * *